United States Patent [19]
Hayashi

[11] Patent Number: 5,684,773
[45] Date of Patent: Nov. 4, 1997

[54] INFORMATION REPRODUCTION APPARATUS COMPATIBLE WITH DIFFERENT RECORDING MEDIA

[75] Inventor: Hideki Hayashi, Tsurugashima, Japan

[73] Assignee: Pioneer Electronic Corporation, Tokyo, Japan

[21] Appl. No.: 623,558

[22] Filed: Mar. 28, 1996

[30] Foreign Application Priority Data

Mar. 28, 1995 [JP] Japan .................................. 7-069994
Aug. 8, 1995 [JP] Japan .................................. 7-202290

[51] Int. Cl.$^6$ .................................................. G11B 5/09
[52] U.S. Cl. .................................. 369/59; 369/58; 369/48
[58] Field of Search .............................. 369/47, 48, 50, 369/54, 58, 59, 124

[56] References Cited

U.S. PATENT DOCUMENTS

| | | | |
|---|---|---|---|
| 4,418,406 | 11/1983 | Ogawa | 369/124 |
| 4,853,915 | 8/1989 | Takasago et al. | 369/58 X |
| 5,229,985 | 7/1993 | Oshiba | 369/59 X |
| 5,452,279 | 9/1995 | Yokota et al. | 369/58 X |
| 5,508,993 | 4/1996 | Hayashi et al. | 369/54 X |

*Primary Examiner*—David C. Nelms
*Assistant Examiner*—P. W. Huber
*Attorney, Agent, or Firm*—Fish & Richardson P.C.

[57] ABSTRACT

A compatible information reproducing apparatus which performs optimum signal processes corresponding to the kinds of a target recording medium for read signals read out from the target recording medium in which digital data signals have been stored and which can accurately reproduce the recorded digital data. The information reproducing apparatus of different recording media each storing a digital data signal is constructed by: a reading system (1, 2, 5) for reading out the digital data signal recorded on a target recording medium (3) and forming a read signal; an A/D converter (11) for A/D converting the read signal and sequentially forming a reproduction sample values; a prediction value setting circuit (13') for forming prediction values in accordance with the kind of a target recording medium; and a Viterbi decoder (12) for performing a Viterbi decoding based on the prediction values for the reproduction sample values, thereby forming a reproduction digital signal.

9 Claims, 11 Drawing Sheets

INFORMATION REPRODUCTION APPARATUS COMPATIBLE WITH DIFFERENT RECORDING MEDIA

BACKGROUND OF THE INVENTION

1. Field of the Invention

The present invention relates to a reproducing apparatus for reproducing a recorded digital data signal and, more particularly, to a compatible reproducing apparatus for reading different kinds of recording media each recording a digital data signal and for reproducing the recorded digital data signal.

2. Description of the Related Art

In recent years, it has been proposed to record a digital signal such as a digital video signal and a digital audio data on an optical disc at a high density while compressing in time the digital signal. For example, a digital video disc (hereinbelow, referred to as a DVD) which has the same radius as that of a compact disc (hereinbelow, referred to as a CD) and which records a digital video signal at a high density has been proposed in "Nikkei Electronics", No. 630, pages 87 to 100, published on Feb. 27, 1995.

The DVD has the same radius as that of the CD but has a memory capacity or a recording density which is several times as large or high as that of the CD. An optical pickup for reading digital data from the DVD has such properties that a wavelength $\lambda$ of a reading beam is short and a numerical aperture NA of an objective lens is large.

In the CD, a digital data signal to be recorded is modulated in the manner of EFM (Eight to Fourteen Modulation). In the DVD, a digital data signal is previously 8/16 modulated in the 8/16 modulation method before recording. A data format including a sync frame, an error correction block, or the like of the CD is different from that of the DVD. Since recording digital data of the DVD includes image data compressed by an MPEG (Moving Picture Experts Group) method, a player for the DVD needs an MPEG decoding circuit. Although, as mentioned above, there are various different points between the CD and the DVD, their disc sizes are equal and a rotating mechanism for rotating the disc can be commonly used for both discs. A compatible player which can play both of the CD and DVD and reproduce their recording information is, therefore, desired.

As disclosed in "O plus E", Vol. July, 1995, No. 188, pages 95 to 101, published on Jul. 5, 1995, the DVD constructs a family having various recording capacities and recording densities.

A single layer DVD has a recording capacity of 4.7 GB per one side. A dual layer DVD has a recording capacity of 8.5 GB per one side. A write once type disc called DVD-R has a recording capacity of about 4 GB per one side. A rewritable type disc called DVD-RAM has a recording capacity of about 2.6 GB per one side.

In those optical discs, as mentioned above, the recording densities are different from each other and amplitudes of read signals upon reproduction are also different from each other. Since, for example, an irradiated laser beam is reflected by an aluminum reflecting film having a high reflectance in the single layer DVD, an amplitude of the read signal is large. Since, however, the irradiated laser beam is reflected by a reflecting film having phase change characteristics of a low reflectance in the DVD-RAM, an amplitude of the read signal is small. In the dual layer DVD, not only the two layers have low reflectances but also the reflectances of the first and second layers are different from each other, so that the amplitudes of the read signals are also different from each other. It is now desirable that such various optical discs having different recording densities and different read signal amplitudes can be reproduced by a common player.

OBJECT AND SUMMARY OF THE INVENTION

It is, therefore, an object of the invention to provide a compatible information reproducing apparatus which executes optimum signal processes corresponding to the kinds of recording media onto the read signals read out from any type of a recording disc on which digital data signals have been stored and which can accurately reproduce the digital data recorded on the disc.

According to the present invention, there is provided an information reproducing apparatus compatible with different recording media each recording thereon a digital data signal, comprising: reading means for reading the digital data signal recorded on the recording medium and forming a read signal; A/D converting means for A/D converting the read signal and sequentially forming a reproduction sample value; prediction value setting means for forming a plurality of prediction values according to a kind of the recording medium; and Viterbi decoding means for performing a Viterbi decoding based on the prediction values for the reproduction sample value, thereby forming a reproduction digital signal.

Briefly, the information reproducing apparatus according to the invention determines the kind of recording medium to be played and performs the Viterbi decoding process onto the read signal from the recording medium on the basis of the prediction values selected in accordance with the discriminated kind.

Even though optical discs having the same radius and whose information recording densities are different have been mentioned, the present invention can be also applied to an apparatus for reproducing recording information of recording disc having different sizes. The prediction value setting means can use any one of the following forms: (1) a form for setting the prediction values in accordance with a disc discrimination signal indicative of the kind of disc which signal may be read out from a specific recording area such as a lead-in area or the like which is common to the different recording media; (2) a form for setting the prediction values in accordance with a density discrimination signal indicative of an information recording density of the disc which signal may be read out from the specific recording area; (3) a form for setting the prediction values in accordance with a reflectance discrimination signal indicative of a light reflectance of the information recording surface of the disc which signal may be read out from the specific recording area; (4) a form for setting the prediction values in accordance with a reproduction layer discrimination signal to identify the information recording surface of the disc which signal may be read out from the specific recording area; (5) a form for detecting an amplitude of a minimum inversion interval signal which signal may be read out from a predetermined recording area such as a lead-in area and for setting the prediction values in accordance with the amplitude; and (6) a form for detecting an amplitude of a sample value train at minimum inversion intervals from an output reproduction sample value of the A/D converting means and for setting the prediction values in accordance with the detected amplitude.

DETAILED DESCRIPTION OF THE PREFERRED EMBODIMENTS

Figure 1:
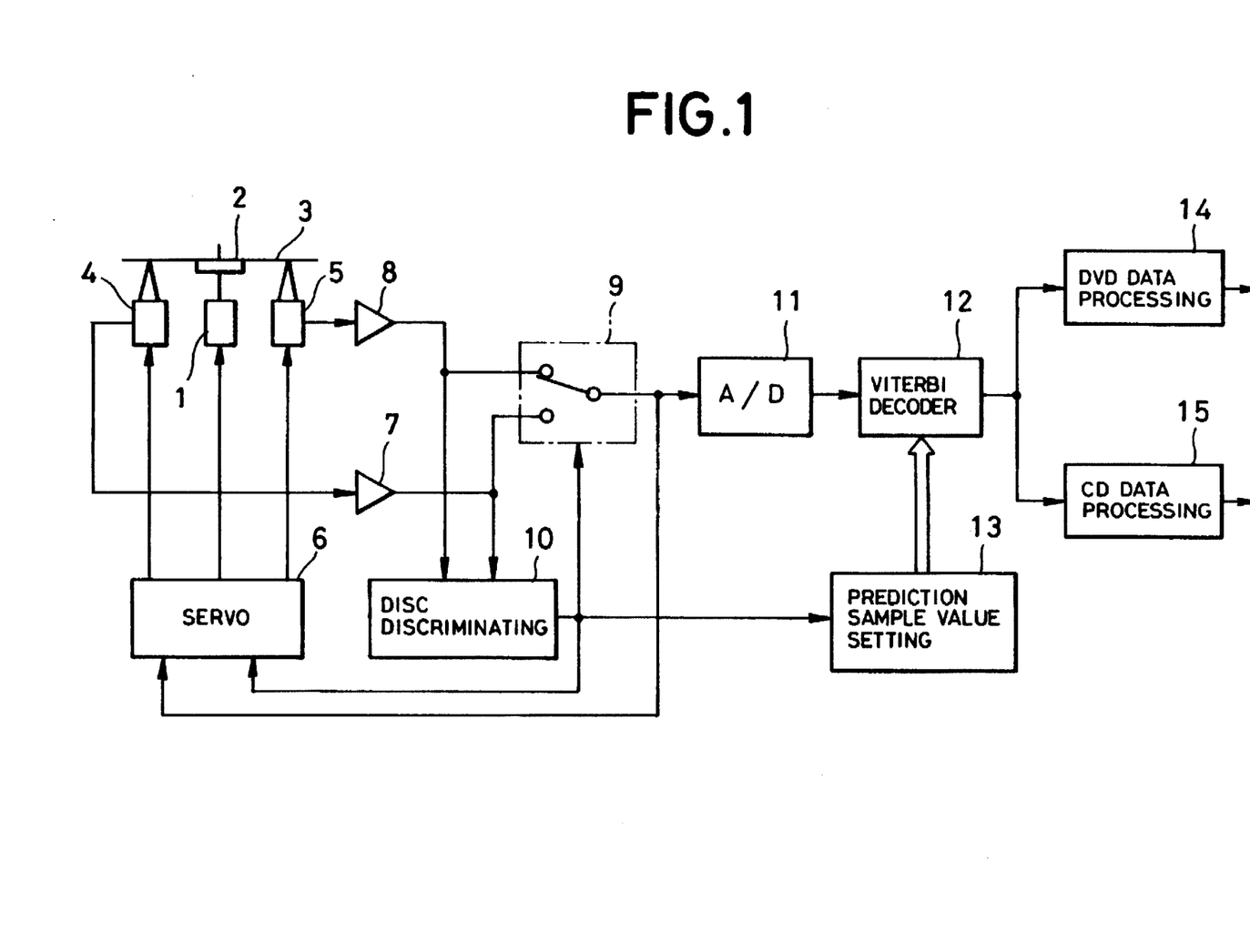
FIG. 1 is a block diagram showing an embodiment of a CD/DVD compatible information reproducing apparatus according to the invention.

FIG. 1 is an example of an optical disc compatible player according to the invention.

In FIG. 1, an optical disc 3 of either one of a CD and a DVD is put on a turntable 2 which is rotated by a spindle driving motor 1 and is played. Two optical pickups 4 and 5 are provided so as to face the recording surface carrying a digital data signal of the optical disc 3. A servo circuit 6 performs a spindle servo so that the spindle motor 1 is rotated at a proper rotational speed and performs a focusing servo and a tracking servo with respect to the optical pickups 4 and 5. A detailed explanation is omitted here with respect to the spindle servo, focusing servo, and tracking servo because they are well-known techniques in the field of the optical disc player. Read signals which are obtained from the optical pickups 4 and 5 are amplified by amplifiers 7 and 8 and are supplied to two input terminals of a change-over switching circuit 9, respectively. The read signals transmitted via the amplifiers 7 and 8 are also supplied to a disc discriminating circuit 10. The disc discriminating circuit 10 discriminates the kind of optical disc 3 on the basis of amplitude levels of the supplied read signals, TOC (Table of Contents) data included in the read signals, frequencies of the read signals, patterns or periods of sync signals included in the read signals, or the like and supplies a discrimination signal indicative of the discrimination result to the change-over switching circuit 9 and servo circuit 6.

For example, it is also considered that the disc discriminating circuit 10 uses such a method that the optical disc is enclosed within an outer cartridge called a caddy and the kind of optical disc is discriminated on the basis of the presence or absence or the shape of a detection hole formed in the caddy. Otherwise, the method of discriminating the kind of optical disc may be done by detecting the presence or absence of the caddy itself.

A discriminating method detecting the kind of the disc is disclosed in a Japanese Patent Application No. 7-51453 by the same applicant as the present application which method detects a thickness of optical disc on the basis of an actual movement amount of an objective lens within an interval between generation time points of the peak of the reflection beam which is obtained during the focusing operation to move the objective lens for converging the read beam and discriminates the kind of disc on the basis of the detected thickness. Such a method may be used that discriminates discrimination pattern provided on a label portion of the disc and determines the kind of disc by the discriminated pattern.

The change-over switching circuit 9 selects the optical pickup which is adapted to the kind of disc discriminated in accordance with the supplied discrimination signal and relays the read signal of the selected one of the optical pickups 4 and 5 to an A/D converter 11. The A/D converter 11 samples the supplied read signal at a predetermined sampling timing and forms a reproduction sample value data train so as to express each level of the sample values to be obtained by, for example, 8-bit data. A Viterbi decoding circuit 12 performs a Viterbi decoding based on prediction sample values which are supplied from a prediction sample value setting circuit 13 onto the reproduction sample value data, thereby forming Viterbi decoded data. The obtained Viterbi decoded data is supplied to a DVD data processing circuit 14 and a CD data processing circuit 15 and is processed, respectively. For example, in the CD data processing circuit, an EFM demodulation and a CIRC (Cross Interleave Reed-Solomon Code) error correction are performed. In the DVD data processing circuit, an 8/16 demodulation, an error correction, and an MPEG decoding are performed.

It is now assumed that the optical pickups 4 and 5 are used for a CD and a DVD, respectively, the wavelengths λ of the read beams of the optical pickups 4 and 5 are equal to, for example, 780 nm and 650 nm, respectively, and the numerical apertures NA of the objective lenses are equal to 0.45 and 0.60, respectively. Rated reading linear velocities with respect to the CD and DVD are equal to 1.2 m/sec and 3.5 m/sec, respectively. Clock frequencies fs included in the digital data signals are equal to, for example, 4.3 MHz and 26 MHz, respectively. In the player shown in FIG. 1, therefore, one of the read signals from the two pickups is selected in accordance with the discrimination signal, the spindle servo is executed so as to obtain the above-mentioned rated linear velocity in accordance with the discrimination signal, and the A/D converter 11 and the signal processing circuits at the post stage operate by the clock frequency corresponding to the discrimination signal.

Figure 2:
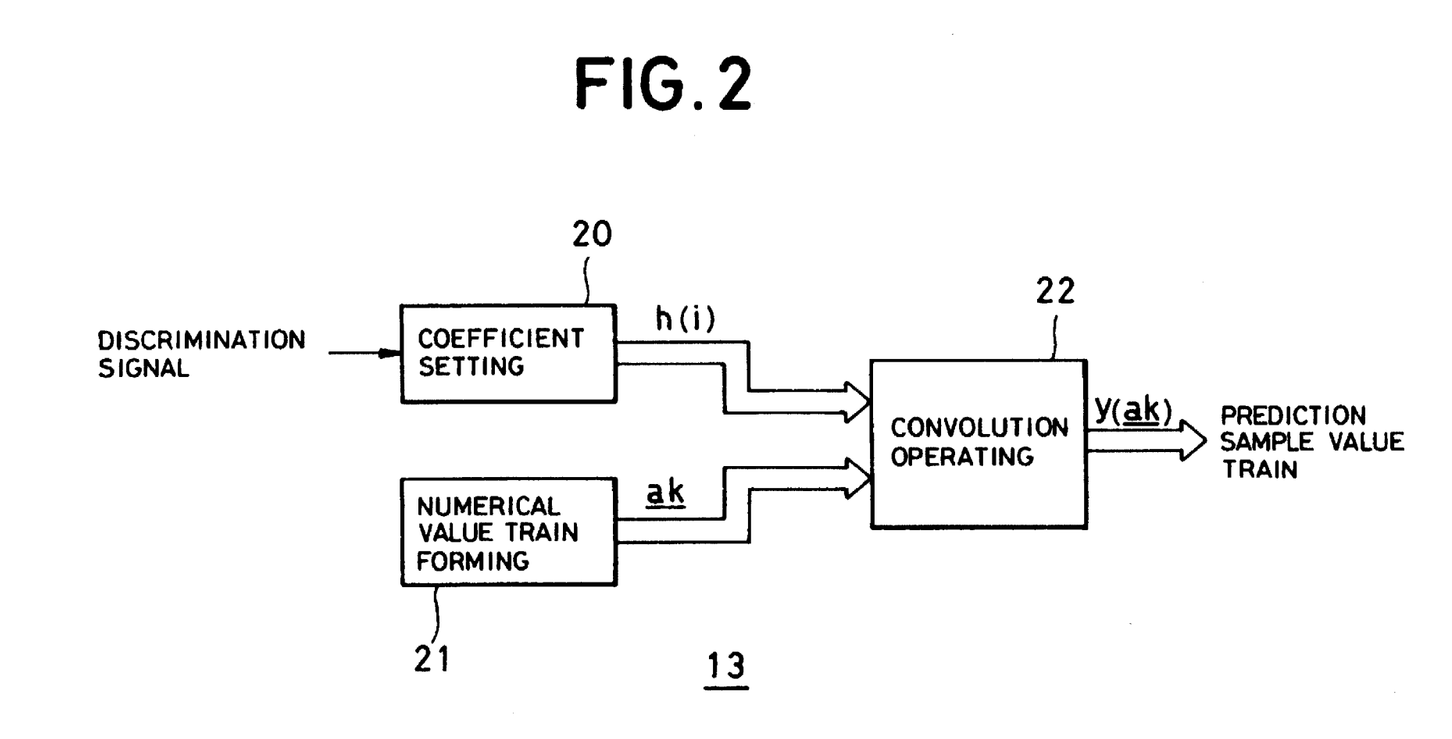
FIG. 2 is a block diagram showing a specific example of a prediction sample value setting circuit in the apparatus of FIG. 1.

For example, as shown in FIG. 2, the prediction sample value setting circuit 13 includes a coefficient setting circuit 20 for generating a coefficient h(i) in accordance with the disc discrimination signal and a numerical value train forming circuit 21 for forming a numerical value train which the read signal can have, namely, a data pattern ak=[a(k), a(k+1), . . . , a(k+n)] (where, k and n are natural numbers). A prediction sample value train y(ak) is formed by a convolution operating circuit 22 for performing a convolution operation $$y(ak) = \sum_{i=0}^{n} h(i)a(k+n-i)$$

by the coefficient h(i) and a numerical value train a(k+n−i) (i is a natural number).

Where, h(i) denotes the tap coefficient of a digital filter for approximating transmitting characteristics of those two signal transmission lines (reading systems) respectively including the optical disc 3 and optical pickups 4 and 5.

Concretely, frequency characteristics of each of the signal transmission lines are sampled so as to obtain a discrete spectrum. By performing a discrete inverse Fourier transformation onto the discrete spectrum, a discrete impulse response is obtained. The discrete impulse response is cut at a proper length and is set to the tap coefficient. An example of the calculating process as mentioned above is also disclosed in the specification of Japanese Patent Application No. 7-7877, paragraph Nos. [0024] to [0028]. According to the calculating process, the tap coefficients of the digital filters for approximating the transmitting characteristics corresponding to the CD and DVD, namely, impulse responses h(i) as shown in the following tables are obtained.

TABLE 1

| |
|---|
| h(−1) = .15327 |
| h( 0) = .26533 |
| h( 1) = .26533 |
| h( 2) = .15327 |

TABLE 2

| |
|---|
| h(−1) = .16038 |
| h( 0) = .21041 |
| h( 1) = .21041 |
| h( 2) = .16038 |

The digital data signal recorded on the CD is EFM modulated. The digital data signal recorded on the DVD is 8/16 modulated. According to the EFM modulating method, original information data of eight bits is converted to a transmission code of 17 bits and is recorded onto the disc. According to the 8/16 modulating method, original information data of 8 bits is converted to a transmission code of 16 bits and is recorded onto the disc. Since the minimum inversion intervals of the modulated data according to both of the modulating methods are equal to 3T (T denotes a clock period of the clock component contained in the modulated data), data patterns of a 1T signal such as {0, 1, 0, 1} and a 2T signal such as {0, 1, 1, 0} cannot appear when expressing by an NRZ (Non Return to Zero) rule. The data patterns which cannot appear can be, therefore, previously excluded from data patterns as targets for Viterbi decoding. With respect to the data patterns which can be generated by the EFM and the 8/16 modulation, by performing the convolution operation mentioned above, the prediction sample value trains for CD and DVD are obtained as shown in the following tables 3 and 4.

TABLE 3

| | | | |
|---|---|---|---|
| y5 = y(1111) | | = | .83718 |
| y4 = y(1110) | = y(0111) | = | .53065 |
| y3 = y(1100) | = y(0011) | = | .00000 |
| y2 = y(1000) | = y(0001) | = | −.53065 |
| y1 = y(0000) | | = | −.83718 |

TABLE 4

| | | | |
|---|---|---|---|
| y5 = y(1111) | | = | .74158 |
| y4 = y(1110) | = y(0111) | = | .42083 |
| y3 = y(1100) | = y(0011) | = | .00000 |
| y2 = y(1000) | = y(0001) | = | −.42083 |
| y1 = y(0000) | | = | −.74158 |

The prediction sample value setting circuit 13, therefore, holds the prediction values and supplies either one group of the prediction sample values to the Viterbi decoding circuit 12 in response to the disc discrimination signal.

Figure 3:
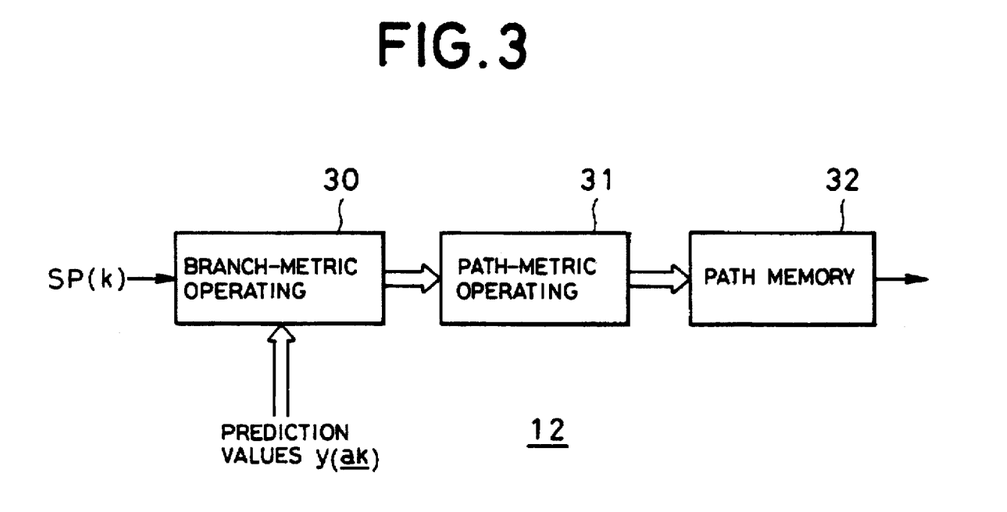
FIG. 3 is a block diagram showing a specific example of a Viterbi decoding circuit in the apparatus of FIG. 1.

FIG. 3 shows a schematic construction of the Viterbi decoding circuit 12. A branch-metric operating circuit 30 generates a square error between a sample value binary data SP(k) (k is a natural number) from the A/D converter 11 and the prediction value y(ak) as a branch-metric value. A path-metric operating circuit 31 accumulates and adds the branch-metric values from the branch-metric operating circuit 30 and forms a path-metric value, and also generates a path selection signal. A path memory 32 updates a data sequence stored therein in accordance with the supplied path selection signal and generates a reproduction digital data signal which has been Viterbi decoded.

The branch-metric operating circuit 30, path-metric operating circuit 31, and path memory 32 perform an arithmetic operation such that the digital data sequence in which the accumulated value of the square errors between the sample value binary data SP(k) and the prediction value y(ak) is minimum is selected to be the reproduction digital data signal. Although various specific constructional examples can be considered, one of them will now be described hereinbelow.

Figure 4:
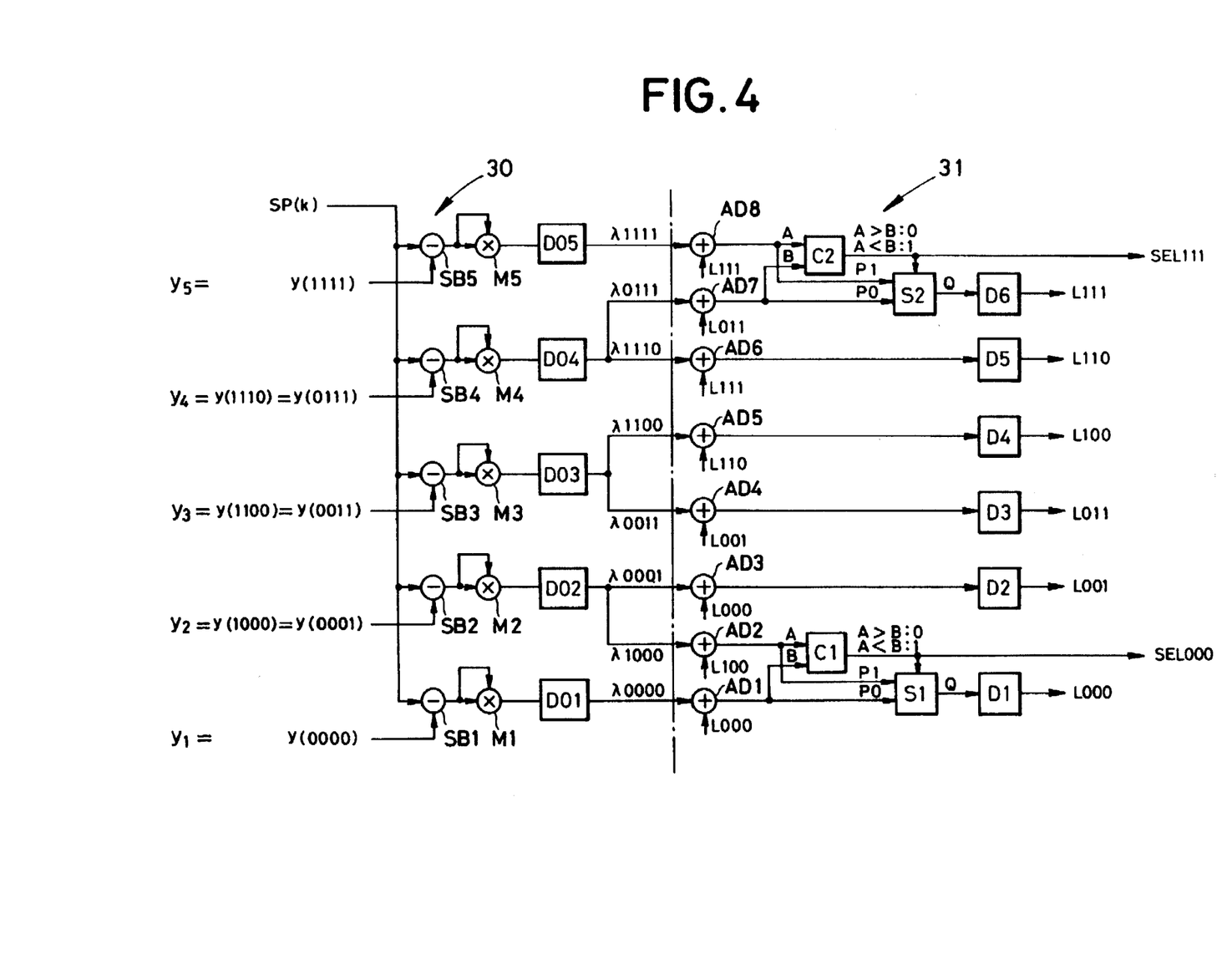
FIG. 4 is a block diagram showing a specific constructional example of a branch-metric operating circuit and a path-metric operating circuit shown in FIG. 3.

FIG. 4 shows a circuit example of the branch-metric operating circuit 30 and path-metric operating circuit 31. The branch-metric operating circuit 30 includes subtracters SB1 to SB5 for calculating differences between the sample value binary data SP(k) which are supplied from the A/D converter 11 and the prediction values y(0000), y(1000)=y(0001), y(1100)=y(0011), y(1110)=y(0111), and y(1111), respectively. A square circuit constructed by multipliers M1 to M5 squares an output of each of the subtracters SB1 to SB5 and supplies the square output to D registers D01 to D05. The D registers D01 to D05 receive the square error values at the same timings as the sampling timings of the A/D converter 11 and supply them to the path-metric operating circuit 31 as branch-metric values λ0000, λ1000, λ0001, λ0011, λ1100, λ1110, λ0111, and λ1111, respectively.

Adders AD1 to AD8 included in the path-metric operating circuit 31 add the branch-metric signals λ0000 to λ1111 and the path-metric signals L000, L100, L000, L001, L110, L111, L011, and L111, respectively. Outputs of the adders AD2 and AD1 are supplied as an A-input and a B-input to a comparator C1 and are further supplied as a P1-input and a P0-input to a selecting circuit S1. When A≧B, the comparator C1 sets a path selection signal SEL000 to logic "0". When A<B, the comparator C1 sets the path selection signal SEL000 to logic "1". When the path selection signal SEL000 is equal to logic "0", the selecting circuit S1 relays a input signal transmitted through the input terminal P0 to a D register D1. When the path selection signal SEL000 is equal to logic "1", the selecting circuit S1 relays the signal transmitted through the input terminal P1 to the D register D1. A comparator C2 and a selecting circuit S2 also operate in a manner similar to the comparator C1 and selecting circuit S1.

D registers D1 to D6 delay the supplied data by holding them only for one clock period, thereby forming the path-metric signals L000, L001, L011, L100, L110, and L111, respectively.

Figure 5:
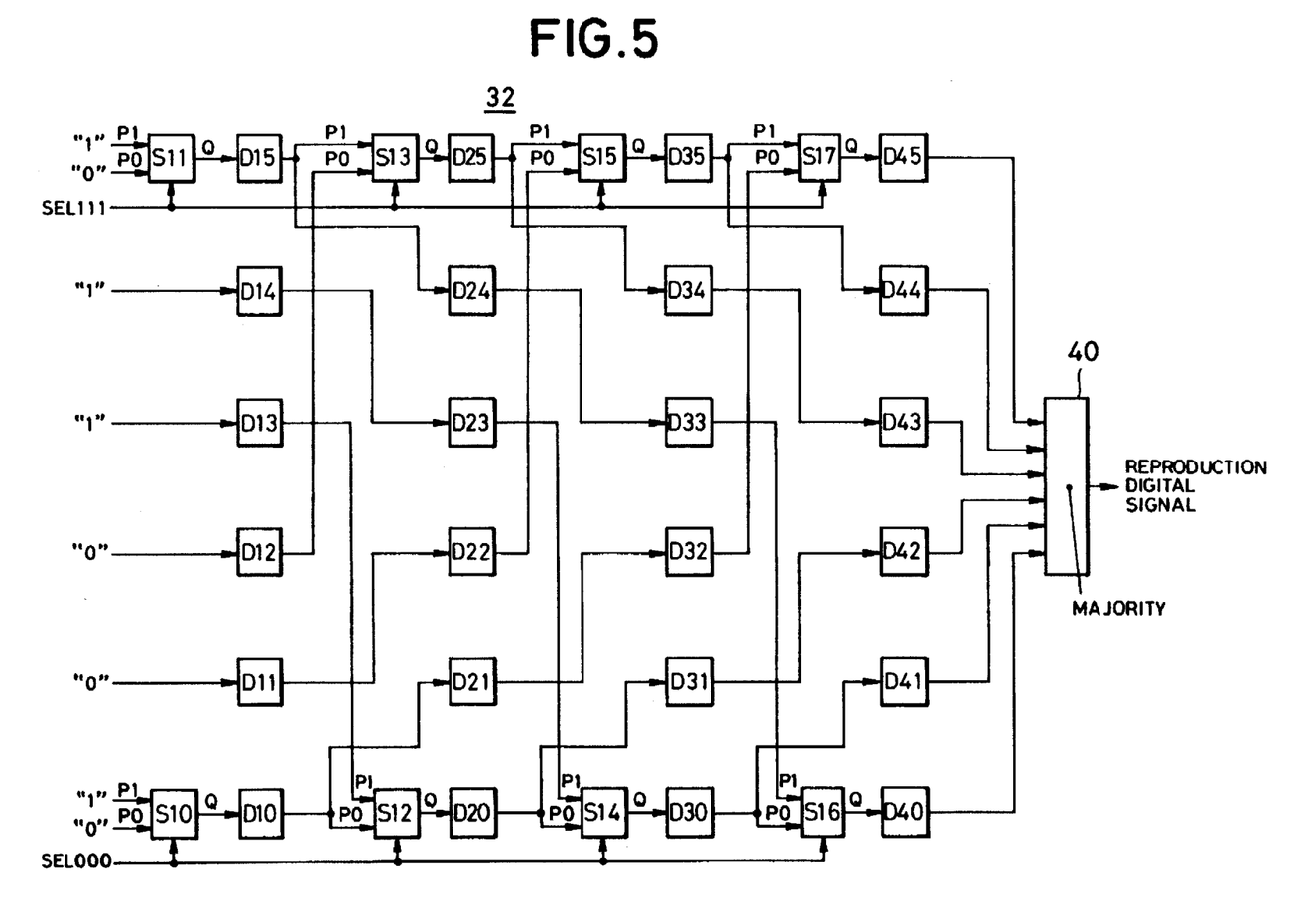
FIG. 5 is a block diagram showing a specific example of a path memory shown in FIG. 3.

FIG. 5 shows a specific example of the path memory 32. The path memory 32 has selecting circuits S10 to S17 which operate in response to the path selection signals SEL000 and SEL111 from the path-metric operating circuit in a manner similar to the selecting circuits S1 and S2. D flip-flops D10 to D15, D20 to D25, D30 to D35, and D40 to D45 operate so as to delay the supplied data only for one clock period at respective stages. Outputs of the D flip-flops D40 to D45 at the final stage are supplied to a majority circuit 40. The majority circuit 40 generates the logical value which is equal to the larger number of supplied logical values "0" or "1", thereby forming the reproduction digital data signal.

The path memory 32 has a format of a memory length of four bits. It is considered that the path memory 32 practically preferably has a format of a memory length of 20 to 200 bits. If the memory length is sufficiently long, such probability rises that all of the data at the final stage coincide, so that the majority circuit 40 may be negligible.

The branch-metric operating circuit 30, path-metric operating circuit 31, and path memory 32 further perform the Viterbi decoding process onto the reproduction sample value sequence by the given prediction values y(ak). It will be obviously understood for a person with ordinary skill in the art that so long as the prediction values are given, various circuit formats for performing the Viterbi decoding process can be realized.

As mentioned above, the Viterbi decoding circuit calculates the square errors between the reproduction sample values and a plurality of prediction sample values, successively accumulates and adds them at every clock, and selects and generates the data sequence in which the accumulated square error is minimum. By executing the above-mentioned maximum likelihood decoding, even when the recording density is high or an S/N ratio of the reproduction signal is low, digital data can be decoded with a high reliability.

The prediction sample value setting circuit 13 in FIG. 1 can be constructed by using, for example, an ROM (Read Only Memory). A group of prediction sample values corresponding to one kind of disc is stored in one group of addresses and another group of prediction sample values corresponding to the other kind of disc is stored in the other group of addresses. By reading out the memory data from one of the address groups in accordance with the disc discrimination signal, the group of prediction sample values which are matched with the disc to be played can be obtained.

Since, as mentioned in the embodiment, the prediction sample values can be calculated from the well-known parameter, the prediction sample values can be previously stored in the ROM. In accordance with the disc discrimination result, therefore, the Viterbi decoding can be promptly performed in the optimum state.

Figure 6:
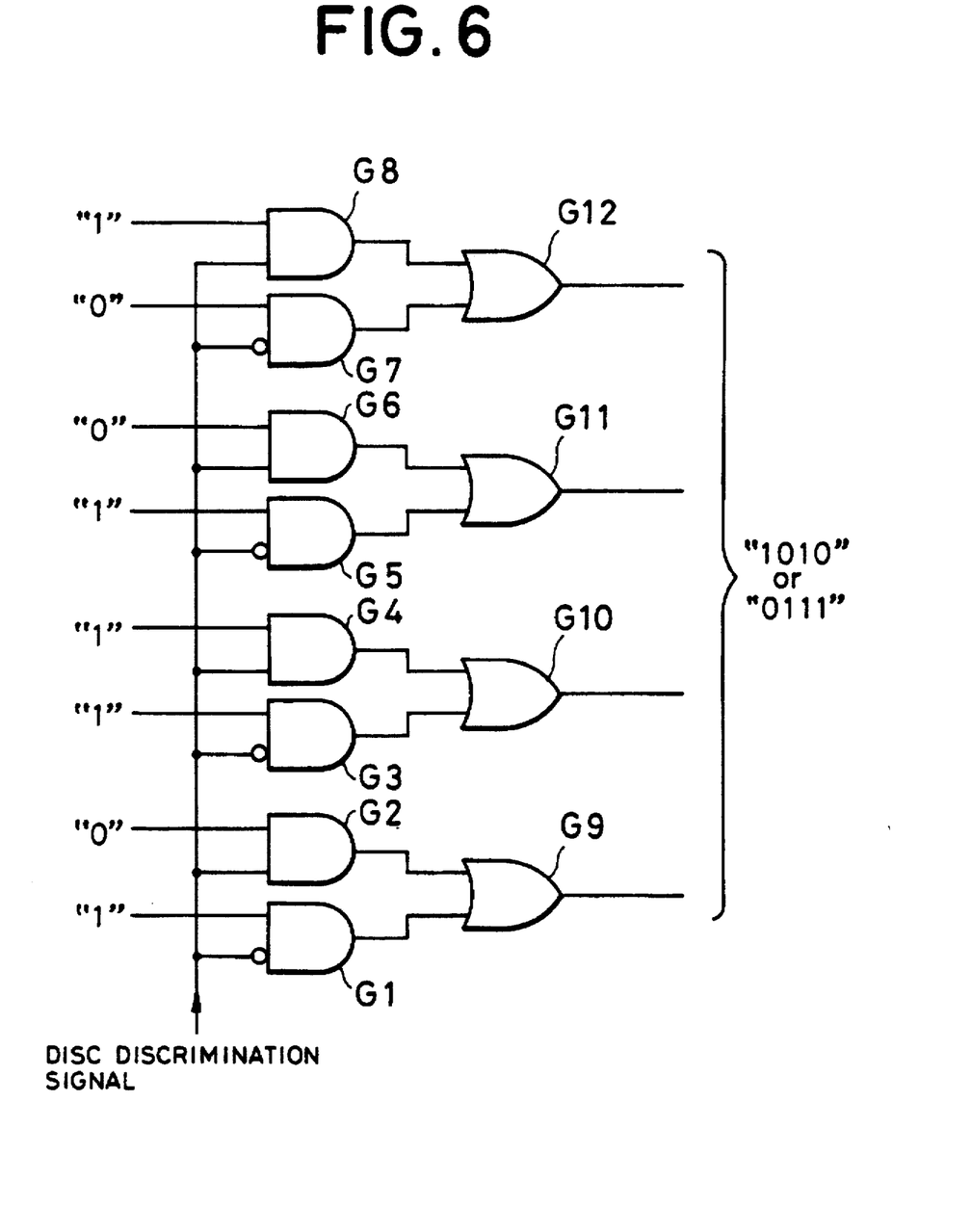
FIG. 6 is a circuit diagram showing a specific example of a part of a prediction sample value setting circuit shown in FIG. 1.

The prediction sample value setting circuit is not limited to the ROM but can be also constructed by a gate circuit as shown in FIG. 6. FIG. 6 shows an example in which Ahex(1010) and 7hex(0111) of hexadecimal numbers are switched. In case the Viterbi decoding circuit needs, for example, five 4-bit numerical values as prediction values, it is sufficient to provide five number of gate circuits each having such construction as shown in FIG. 6.

When an optical head having two focal points including a hologram element (HOE) disclosed in the Record of the 55th lecture meeting of The Japan Society of Applied Physics, 19P-S-4 and 19P-S-5 is used in place of the optical pickups 4 and 5 and change-over switching circuit 9 in FIG. 1, a construction in which focal point positions of the optical head having two focal points are switched by the disc discrimination signal can be used for the optical discs each having different thicknesses of substrates.

Although the embodiment has been described above with respect to the compatible player for the CD and DVD, the present invention is not limited to the particular embodiment but is based on a fundamental concept to perform the Viterbi decoding in an appropriate manner with respect to all of digital data recording discs.

In accordance with the invention, the Viterbi decoding is preferably performed for those discs of what is called as DVD family such as single layer DVD, dual layer DVD, DVD-R, and DVD-RAM.

Figure 7:
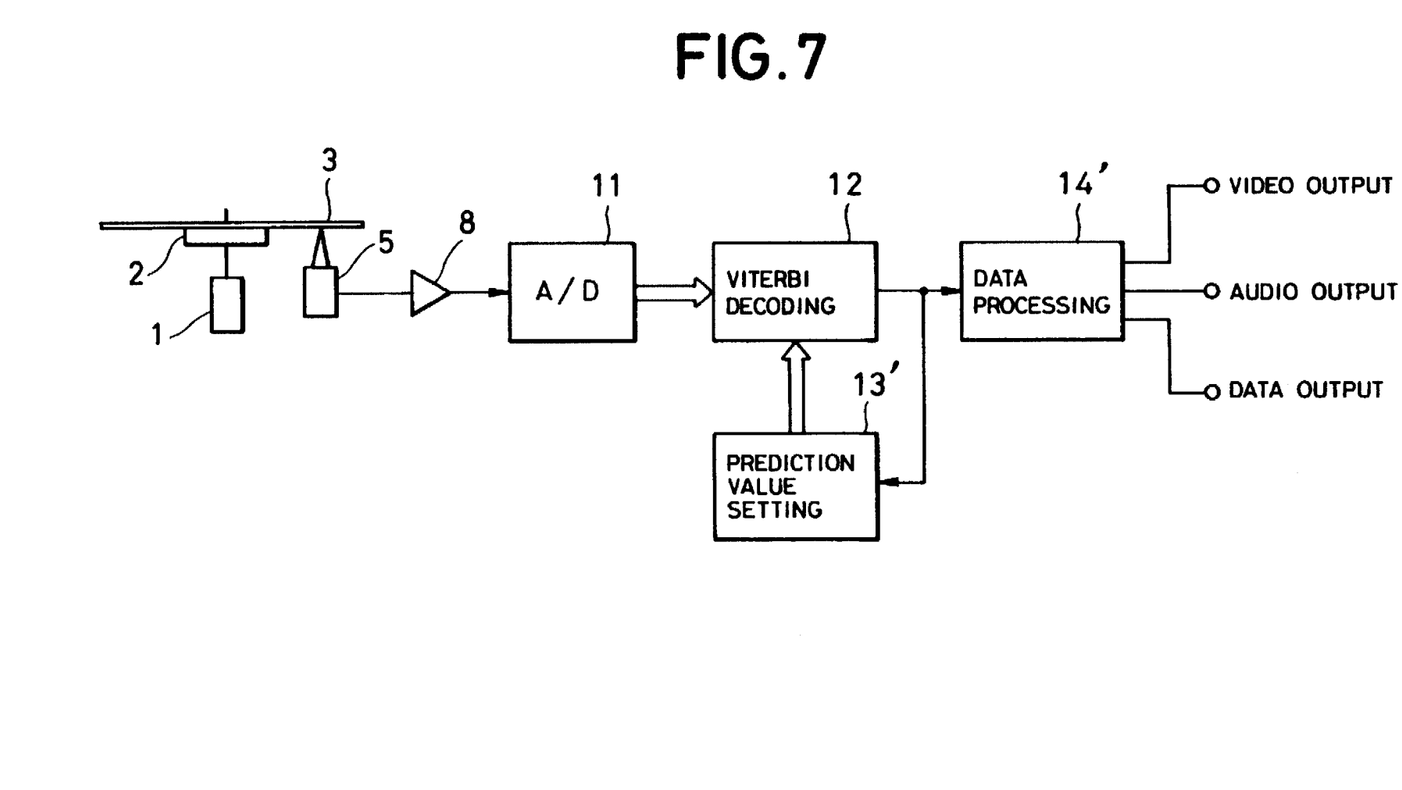
FIG. 7 is a block diagram showing an embodiment of an DVD family compatible information reproducing apparatus according to the invention.

FIG. 7 shows a construction of the compatible disc player for the DVD family. Counterparts to those of the player shown in FIG. 1 are designated by the same reference numerals.

In FIG. 7, an analog read signal from the pickup 5 is sampled so as to produce a digital signal representing the instantaneous level of the read signal, namely, a reproduction sample value by the A/D converter 11 and is supplied to the Viterbi decoding circuit 12. The Viterbi decoding circuit 12 performs the Viterbi decoding to the reproduction sample value which is sequentially supplied, forms a binary reproduction digital signal, and supplies it to a data processing circuit 14'. The data processing circuit 14' fundamentally performs a demodulating process of an 8/16 modulation code of a recording modulation code of the DVD system, an error correcting process, and an MPEG decoding process, and properly performs a signal process corresponding to each disc of the DVD family on the basis of a digital read signal from the Viterbi decoding circuit 12. As results of all of the processes, the data processing circuit 14' distributes and supplies a video signal to a video system (not shown), an audio signal to an audio system (not shown), and a data signal to a data system.

Different from the player of FIG. 1, a prediction value setting circuit 13' decides prediction values in accordance with a Viterbi decoding output and sets the prediction values into the Viterbi decoding circuit 12.

Since in this embodiment, the minimum inversion interval of the read signal is equal to 3T, the Viterbi decoding can be realized by a circuit construction similar to that in FIGS. 3 to 5. However, the circuit 13' is not adapted to simply select either one of the two groups of such prediction values of the Viterbi decoding as shown in TABLEs 3 and 4 for the playing of either one of the CD and the DVD. In this instance, a prediction value y3 in either TABLE 3 or 4 corresponds to a center value in the reproduction sample value sequence and is equal to 0. A prediction value y4 corresponds to a positive peak of a 3T signal (signal which is inverted at intervals of 3T). A prediction value y2 corresponds to a negative peak of the 3T signal. A value of (y4−y2) therefore corresponds to an amplitude of the 3T signal. A prediction value y5 corresponds to a positive peak of a whole reproduction sample value sequence. A prediction value y1 corresponds to a negative peak of the whole reproduction sample value sequence. A value of (y5−y1) corresponds to an amplitude of the whole reproduction sample value sequence.

When an information recording density of the disc is high, the 3T signal is remarkably attenuated because of the MTF of an optical system for reading the disc and the amplitude of the read signal appears smaller. In this case, therefore, it is preferable to reduce the absolute values of y4 and y2 in proportionate to the attenuated amount. In case the amplitude of the read signal is relatively small, it is preferred to reduce the absolute values of y5, y4, y2, and y1 in proportionate to the amplitude.

On the basis of the above-mentioned concept, namely, the prediction value setting circuit 13' discriminates the recording density of the DVD and the amplitude of the read signal on the basis of the property of the output signal of the Viterbi decoding circuit 12 and modifies the respective values of y5, y4, y2, and y1 to optimum values in accordance with the discrimination result. The Viterbi decoding circuit 12 can perform the Viterbi decoding onto the read signal by the thus modified prediction values which are matched to the disc to be played or the read signal therefrom, so that an error rate in the decoded data can be reduced. As mentioned above, a correct reproduction of the recording signal can be also accomplished for any target discs.

Figure 8:
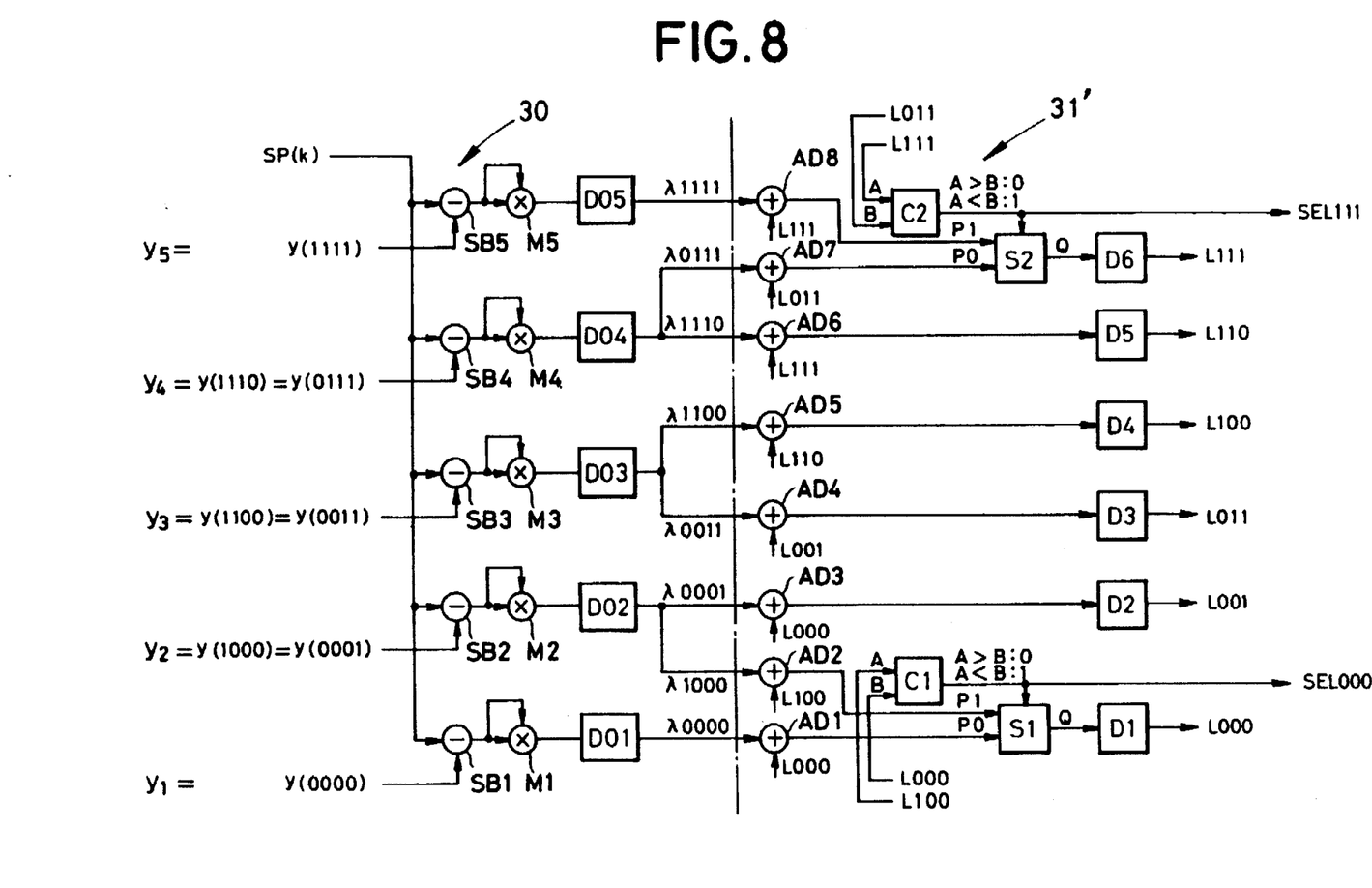
FIG. 8 is a detailed block diagram showing an example in which the branch-metric operating circuit and path-metric operating circuit shown in FIG. 3 are improved.

The path-metric operating circuit as shown in FIG. 8 is obtained by improving such path-metric operating circuit 31 shown in FIG. 4. Since it takes a long time until all of the adder AD8, comparator C2 and selecting circuit S2 finish their procedures on the branch-metric value $\lambda 1111$ generated from the D register D05 in FIG. 4, the final processing result obtained by the adder AD8, comparator C2, and selecting circuit S2 cannot be correctly fetched into the D register D6 at the next stage when a frequency of a sampling clock is raised whereby a high speed processing is limited.

In the circuit of FIG. 8, the above-mentioned problem can be avoided. Namely, comparison inputs of the comparator C1 are set to the path-metric signals L000 and L100 and comparison inputs of the comparator C2 are set to the path-metric signals L011 and L111. Signals which are substantially equivalent to the path selection signals SEL000 and SEL111 in FIG. 4 are, therefore, obtained.

The branch-metric operating circuit 30 and a path-metric operating circuit 31' will now be described in detail. In the branch-metric operating circuit 30, first, square error values between the sample value SP(k) and the prediction values y1 to y5 are obtained as branch-metric values $\lambda 0000$, $\lambda 1000$, $\lambda 0001$, $\lambda 0011$, $\lambda 1100$, $\lambda 1110$, $\lambda 0111$, and $\lambda 1111$. While selecting the minimum one of the accumulated addition values, i.e. path-metric values, by the path-metric operating circuit 31' as a next value to be added, the adders AD1 to AD8 perform the accumulation and addition for the respective branch-metric values.

In the path-metric operating circuit 31', a magnitude comparison result of the path-metric values L111 and L011 (path-metric values L100 and L000) which are supplied as values to be added to the adders AD7 and AD8 (adders AD1 and AD2) is used in order to select the minimum accumulated addition value as mentioned above. In other words, the accumulated addition values themselves are not compared with each other in order to select the minimum accumulated addition value.

The above-mentioned construction is made in consideration of the fact that the prediction values y1 and y2 and, further, y4 and y5 are relatively near values, respectively, in such recording information reproducing apparatus as shown in FIG. 1 or 7 using an optical disc as the recording medium.

For example, in the constructions in FIGS. 4 and 8,

| Addition result of the adder AD8 |
|---|
| = $\lambda 1111$ + L111 |
| = $\{y5 - SP(k)\}^2$ + L111 |
| Addition result of the adder AD7 |
| = $\lambda 0111$ + L011 |
| = $\{y4 - SP(k)\}^2$ + L011 |

It is in this instance assumed that the prediction values y4 and y5 are relatively close to each other, the magnitude relation between the accumulated addition results by the adders AD7 and AD8 can be discriminated by comparing the path-metric values L111 and L011.

According to the construction of such path-metric operating circuit 31' as shown in FIG. 8, the magnitude relation between the accumulated addition values by the adders can be discriminated without waiting for a time which is expended for the adding processes by the adders AD7 and AD8 (adders AD1 and AD2). As mentioned above, as compared with the construction of FIG. 4 in which the magnitudes of the accumulated addition values themselves are compared, a high speed processing can be realized in the circuit 31'.

In the construction of FIG. 8, the prediction value setting circuit 13' discriminates the recording density of the DVD and the amplitude of the read signal from the output signal of the Viterbi decoder 12 and modifies the values of y5, y4, y2, and y1 to the optimum values in accordance with the discrimination results. The operation and effectiveness which are adapted to the target disc to be played in FIG. 8 are therefore the same as in FIG. 4 while realizing a high speed processing.

In the recorded information reproducing apparatus using the optical disc as the recording medium, such as shown in FIG. 1 or 7, there may possibly occur such a phenomenon called an "asymmetry" where pit lengths of recording pits are asymmetrical because of deformation occurring during the formation process of the optical disc or changes in condition at the recording of information.

Figure 9A:
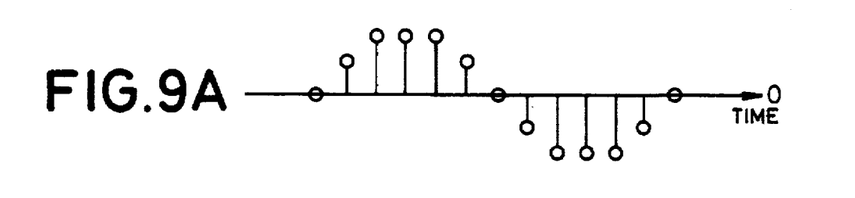
FIGS. 9A to 9C show examples of reproduction sample value sequences which are generated from an A/D converter in the information reproducing apparatus in the embodiment according to the invention and are schematic diagrams showing an outline of an influence by an asymmetry and its countermeasure.
Figures 9B, 9C:
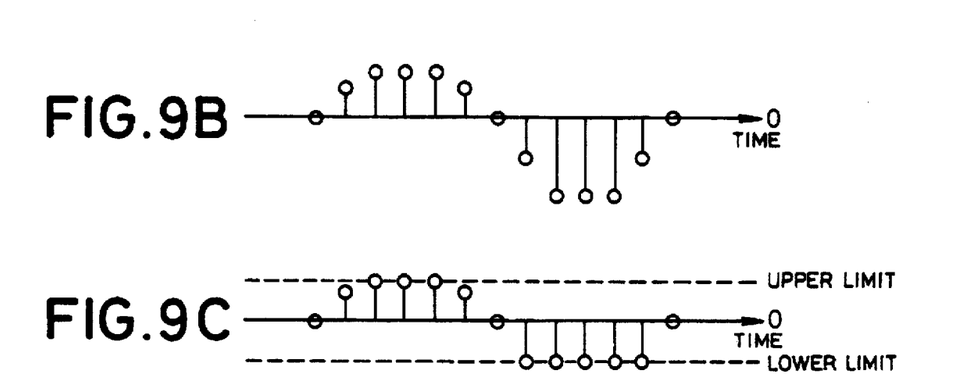

FIG. 9A is a diagram showing an example of the sample value sequence which is generated from the A/D converter 11 in FIG. 7 in case the asymmetry has not taken place. FIG. 9B is a diagram showing an example of the sample value sequence which is generated from the A/D converter 11 in FIG. 7 in case the asymmetry has occurred.

When the asymmetry occurs in the recording pits, the amplitudes of the sample values are asymmetrical in the upper and lower sides as shown in FIG. 9B, so that the sample values are remarkably deviated from the prediction values. A decoding performance of the Viterbi decoder, therefore, deteriorates.

As shown in FIG. 9C, a method of solving the asymmetry on the upper and lower sides of the sample values due to the asymmetry in the recording pits is executed by respectively limiting the upper and lower limits of the sample values which are suppressed to predetermined values.

Figure 10:
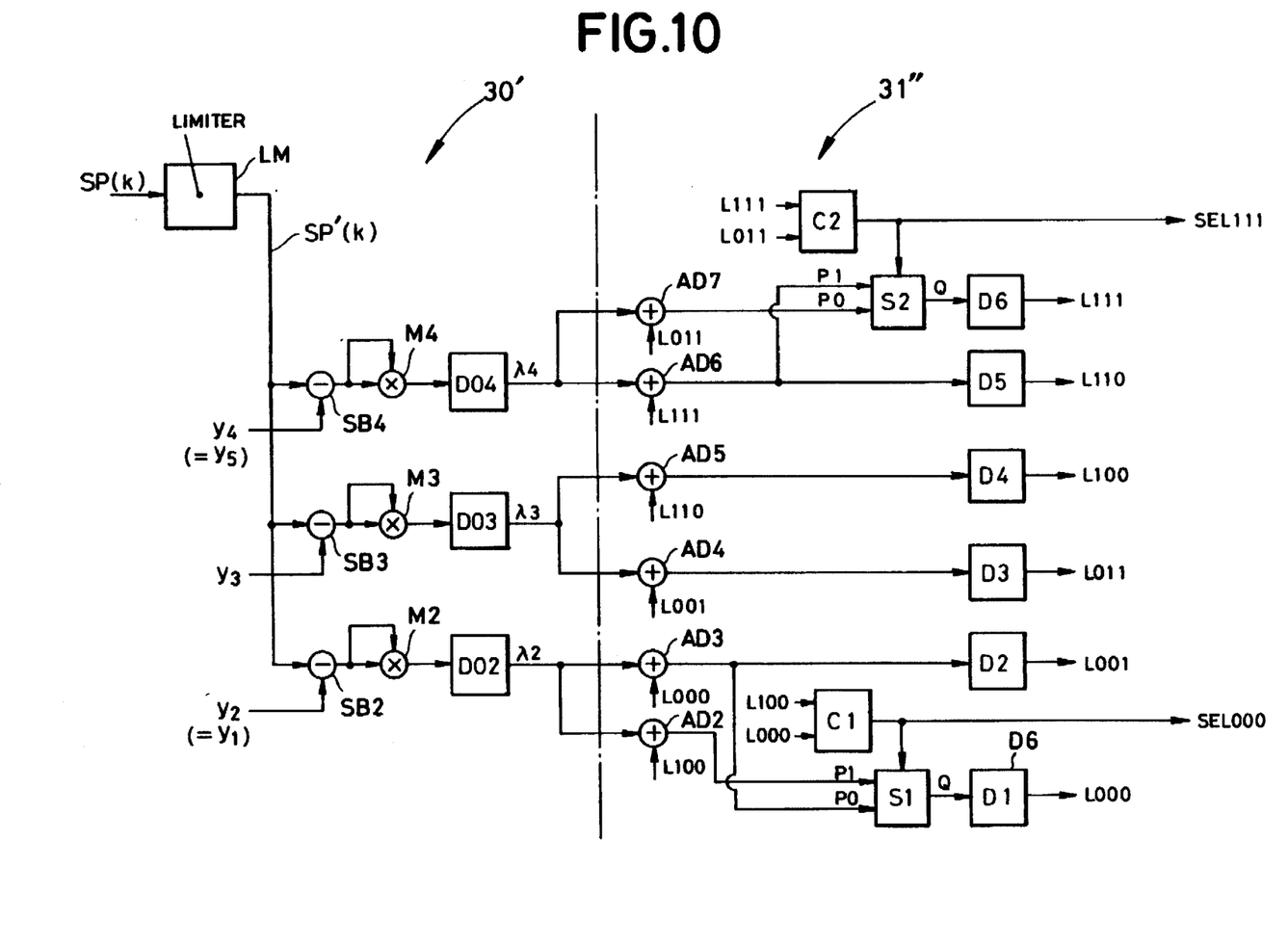
FIG. 10 is a detailed block diagram showing another example which includes the branch-metric operating circuit and path-metric operating circuit which are improved from those in FIG. 3.

FIG. 10 is a diagram showing internal constructions of a branch-metric operating circuit 30' and a path-metric operating circuit 31" constructed by applying the particular method to the branch-metric operating circuit 30 and path-metric operating circuit 31' shown in FIG. 8.

In FIG. 10, a limiter LM supplies sample values SP'(k) with limited amplitudes obtained by limiting in amplitude the sample values SP(k) which are supplied from the A/D converter 11 within upper and lower limits which are equal to the prediction values y4 and y2, respectively, to one input of each of the subtracters SB2 to SB4. The subtracters SB2 to SB4 arithmetically operate differences between the prediction values y2 to y4 and the amplitude-limited sample values SP'(k) whose amplitude value are limited and supply them to the corresponding square circuits M2 to M4, respectively. Square error values such as $\{y2-SP'(k)\}^2$, $\{y3-SP'(k)\}^2$, and $\{y4-SP'(k)\}^2$ are, therefore, generated from the square circuits M2 to M4 synchronously with the sampling timing of the A/D converter 11 at every sample value.

The D registers D02 to D04 receive the square error values at the same clock timings as the sampling timings and supply them as branch-metric values $\lambda 2$ to $\lambda 4$ to the path-metric operating circuit 31", respectively.

The adder AD2 of the path-metric operating circuit 31" supplies an addition value obtained by adding the branch-metric value $\lambda 2$ and the path-metric value L100 supplied from the D register D4 to the selecting circuit S1. The adder AD3 supplies an addition value obtained by adding the branch-metric value $\lambda 2$ and the path-metric value L000 supplied from the D register D1 to each of the selecting circuit S1 and D register D2. The comparator C1 compares the path-metric value L100 and path-metric value L000. When L100≧L000, the comparator C1 sets the path selection signal SEL000 to "0". When L100<L000, the comparator C1 sets the SEL000 to "1". In case the path selection signal SEL000 is equal to "0", namely, the path-metric value L100 is equal to or larger than the path-metric value L000, the selecting circuit S1 selects the addition result of the adder AD3 and supplies to the D register D1. When the path selection signal SEL000 is equal to "1", namely, the path-metric value L100 is smaller than the path-metric value L000, the selecting circuit S1 selects the addition result of the adder AD2 and supplies to the D register D1. The D register D1 receives the addition result supplied from the selecting circuit S1 at the same clock timing as the sampling timing and feeds it back as a path-metric value L000 to each of the adder AD3 and comparator C1.

The D register D2 receives the addition result supplied from the adder AD3 at the same clock timing as the sampling timing and feeds it back as a path-metric value L001 to the adder AD4. The adder AD4 supplies the addition result obtained by adding the branch-metric value λ3 and path-metric value L001 supplied from the D register D2 to the D register D3. The D register D3 receives the addition result supplied from the adder AD4 at the same clock timing as the sampling timing and feeds it back as a path-metric value L011 to each of the adder AD7 and comparator C2. The adder AD5 supplies the addition result obtained by adding the branch-metric value λ3 and path-metric value L110 supplied from the D register D5 to the D register D4. The D register D4 receives the addition result supplied from the adder AD5 at the same clock timing as the sampling timing and feeds it back as a path-metric value L100 to each of the adder AD2 and comparator C1. The adder AD6 supplies the addition result obtained by adding the branch-metric value λ4 and path-metric value L111 supplied from the D register D6, which will be described hereinlater, to the D register D5 and selecting circuit S2. The adder AD7 supplies the addition result obtained by adding the branch-metric value λ4 and path-metric value L011 supplied from the D register D3 to the selecting circuit S2. The D register D5 receives the addition result supplied from the adder AD6 at the same clock timing as the sampling timing and feeds it back as a path-metric value L110 to the adder AD5.

The adder AD7 supplies the addition value obtained by adding the branch-metric value λ4 and path-metric value L011 supplied from the D register D3 to the selecting circuit S2. The comparator C2 compares the path-metric values L111 and L011. When L111≧L011, the comparator C2 sets the path selection signal SEL111 to "0". When L111<L011, the comparator C2 sets the SEL111 to "1". When the path selection signal SEL111 is equal to "0", namely, the path-metric value L111 is equal to or larger than the path-metric value L011, the selecting circuit S2 selects the addition result of the adder AD7 and supplies to the D register D6. When the path selection signal SEL111 is equal to "1", namely, the path-metric value L111 is smaller than the path-metric value L011, the selecting circuit S2 selects the addition result of the adder AD6 and supplies to the D register D6. The D register D6 receives the addition result supplied from the selecting circuit S2 at the same clock timing as the sampling timing and feeds it back as a path-metric value L111 to each of the adder AD6 and comparator C2, respectively.

In the embodiment shown in FIG. 10, as mentioned above, the Viterbi decoding is performed by using the amplitude-limited sample values obtained by limiting the amplitude of the sample values obtained in correspondence to the read signal by the limiter LM. Among the prediction values y1 to y5 used in the construction shown in FIG. 4, the prediction values y1 and y2 are regarded to be equal to a common value which is equal to the lower limit of the limiter LM. The prediction values y4 and y5 are, further, regarded to be equal to another common value which is equal to the upper limit of the limiter LM.

According to the construction, even if the asymmetry would occur and the sample value would be remarkably deviated from the prediction values, the amplitude-limited sample values SP'(k) which are supplied to the subtracters SB2 to SB4 do not exceed a range of the prediction values y2 to y4 because of the construction mentioned above, so that the deterioration in performance of the Viterbi decoding can be suppressed.

Even when the construction of FIG. 10 is used, the prediction value setting circuit 13' may discriminate the recording density of the DVD and the amplitude of the read signal from the output signal of the Viterbi decoder 12 and modifies the values of y4 and y2 to the optimum values in accordance with the discrimination result. The operation and effect adapted to the same disc as that in FIG. 4 can be, therefore, obtained and accomplished while realizing a high speed processing and taking a countermeasure for the asymmetry. When, more specifically, the information recording density of the disc is high or when the amplitude of the read signal is small, it is preferred to reduce the absolute values of y4 and y2.

Several specific examples of the prediction value setting circuit 13' shown in FIG. 7 will now be described hereinbelow.

There is a method using information which is recorded at a lead-in area of the disc which is commonly assured in both of the CD and the DVD. The lead-in area is a recording area prepared in, for example, the innermost rim portion of the disc and exists at a position prior to a program area for recording main information. In the lead-in area, various signals indicative of the recording contents or outline of the program area, or the like are recorded. As one of the recording signals, there is a disc discrimination signal indicating that the disc belongs to the disc of which type (kind). That is, the disc discrimination signal indicates any one of the single layer DVD, dual layer DVD, DVD-R, and DVD-RAM.

The prediction value setting circuit 13' obtains the disc discrimination signal from the output signal of the Viterbi decoder 12 during the reading operation of the lead-in area, discriminates the kind of a target disc from the contents of the disc discrimination signal, and sets the optimum prediction value in accordance with the discrimination result. That is, the prediction values individually corresponding to the disc types are previously held as data in the prediction value setting circuit, the prediction values of the disc type are extracted or selected from the holded data and then are supplied to the Viterbi decoder.

As another method using the recorded signal of the lead-in area, there is a method of discriminating the disc by using a density discrimination signal. The density discrimination signal indicates an information recording density of the disc and is expressed by a track length d [μm/bit] per bit of the recording information. For example, the density discrimination signal of two bits can express four kinds of recording densities such as d0, d1, d2, and d3. The prediction value setting circuit 13' obtains the density discrimination signal from the output signal of the Viterbi decoder 12 during the reading operation of the lead-in area, discriminates the kind of the target disc from the contents of the density discrimination signal, and sets the optimum prediction values in accordance with the discrimination result. The prediction values adapted to the recording density of the target disc to be read can be, therefore, obtained. In this case, the prediction value setting circuit may have such a construction that the prediction values of every recording density are prepared and the prediction values corresponding to the discriminated disc type (namely, the type classified by the recording density) are supplied to the Viterbi decoder. When the prediction values which are made to correspond to both of the recording density and the amplitude of the read signal are prepared, the prediction values which are adapted to both of them can be given to the Viterbi decoder by also using the discrimination result by a reflectance, which will be explained hereinbelow.

The recorded signal in the lead-in area includes a reflectance discrimination signal. The reflectance discrimination signal is expressed by a ratio of light quantities r[%] between an incident laser beam and a reflected laser beam of the disc. For example, the reflectance discrimination signal of two bits can express four kinds of reflectance such as r0, r1, r2, and r3. The prediction value setting circuit 13' obtains the reflectance discrimination signal from the output signal of the Viterbi decoder 12 during the reading operation of the lead-in area, discriminates the type of reading target disc from the contents of the reflectance discrimination signal, and sets the optimum prediction values in accordance with the discrimination result. The prediction values adapted to the amplitude of the read signal of the target disc to be read can be, therefore, obtained. In this case, the prediction value setting circuit may have such a construction that the prediction values of each reflectance, namely, each amplitude of the read signal are prepared and the prediction values corresponding to the discriminated disc type (that is, the type which is classified by the reflectance) are supplied to the Viterbi decoder. So long as the prediction values which are made to correspond to both of the recording density and the amplitude of the read signal are prepared, the prediction values adapted to both of them can be given to the Viterbi decoder by additionally exploiting the discrimination result based on the recording density mentioned above.

In case of reading the dual layer DVD, the prediction value setting circuit 13' reads a reproduction layer discrimination signal recorded in, for example, a sector header (a recording area for an address signal or the like provided at the head of a recording sector) and may discriminate an amplitude of the read signal to be obtained from a target information recording layer. In the disc having the double-layered structure in which the reflectance of the information recording layer for a reading beam has been specified in each layer (the reflectance of the layers are different), the amplitudes of the read signals which are obtained are different, and therefore the prediction value setting circuit 13' obtains the reproduction layer discrimination signal from the output signal of the Viterbi decoder 12, discriminates the target information recording layer from the contents of the reproducing layer discrimination signal, and sets the optimum prediction values in accordance with the discrimination result. The prediction values adapted to the amplitude of the read signal which are derived from the target information recording layer can be obtained.

Figure 11:
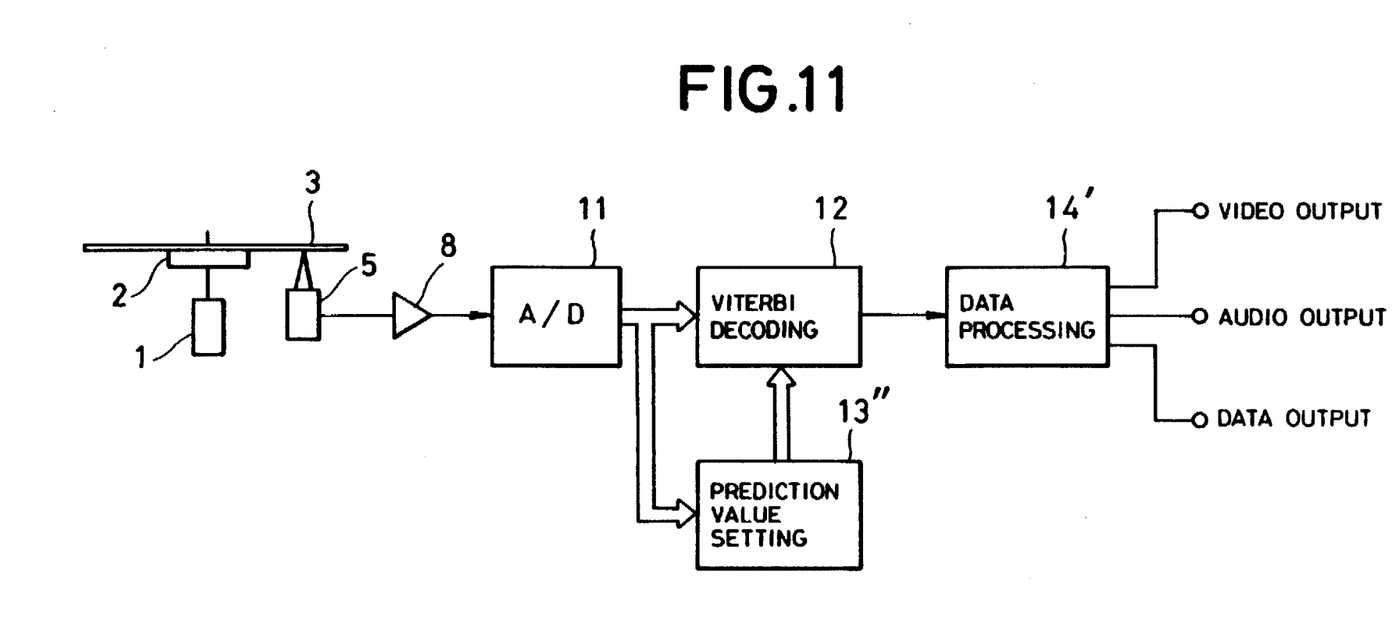
FIG. 11 is a block diagram showing another embodiment of an DVD family compatible information reproducing apparatus according to the invention.

It is, on the other hand, to be understood that the disc player may be so constructed as shown in FIG. 11, wherein the prediction values are so selected as to adapt to the target disc which is to be played.

In FIG. 11, the prediction value setting circuit 13" sets the prediction values for the Viterbi decoding on the basis of the output signal of the A/D converter 11. The prediction value setting circuit 13" detects the amplitude of, for example, the minimum inversion interval signal, for example the 3T signal, recorded in the lead-in area from the sample value train of the read signal which is issued from the A/D converter 11 during the reading of the lead-in area. The amplitude tends to decrease when the information recording density of the disc is high, and to increase when the density is low. By detecting the amplitude, the information recording density of the reading target disc can be discriminated. The prediction value setting circuit 13", therefore, sets the optimum prediction values in accordance with the amplitude of the detected minimum inversion interval signal. The prediction values are now adapted to the information recording density of the target disc and the amplitude of the read signal. Although the example using the minimum inversion interval signal recorded in the lead-in area has been explained, the invention is not limited to such embodiment. It is also possible to construct in such a manner that the amplitude of the minimum inversion interval signal recorded in another area such as a program area or the like is detected from the sample value train of the read signal which is the output of the A/D converter 11 upon reading, thereby obtaining the similar operation and effect.

As mentioned above, in the optical disc, there is a case where a phenomenon called an asymmetry such that the read signal is asymmetrical on the upper and lower sides occurs because of a fluctuation of the recording power upon recording or the like. Particularly, in the DVD-R and DVD-RAM, the asymmetry is likely to increase since it is difficult to strictly manage the recording conditions.

As a countermeasure, the prediction values which are supplied to the Viterbi decoder 12 are set to be asymmetrical on the upper and lower sides in accordance with the asymmetry which occurred, so that a deterioration in error rate of the decoded data by the asymmetry can be reduced. It is preferred that each of the prediction value setting circuits 13, 13', and 13" supplies the asymmetrical prediction values according to the asymmetry which is presumed by, for example, the kind of disc to the Viterbi decoder 12. The prediction value setting circuit can also detect an upper peak level and a lower peak level of the reproduction sample value train from, for example, the A/D converter 11 and can supply the asymmetrical prediction values according to a difference between those upper and lower peak levels to the Viterbi decoder. When expressing the above point by using the prediction values shown in FIG. 4, the values are set as follows.

$|y5| \neq |y1|$ $|y4| \neq |y2|$

In the above explanations, although only the optical disc has been mentioned as a recording medium, fundamentally, the invention is not limited to it but can be also applied to the information reproducing apparatus using the other recording medium such as a magnetic disc or the like. Further explaining, although the compatible disc player for the CD/DVD is shown in FIG. 1 and the compatible disc player for the DVD family is shown in FIGS. 7 and 11, it will be obviously understood that a disc player in which the above two compatible techniques are mixed can be constructed. Although the optimum prediction value has been obtained by a predetermined calculating method in the above embodiment, the invention is not limited to this method but the optimum prediction value can be also derived by experiments.

As will be obviously understood from the above description, in the recorded digital data information reproducing apparatus according to the invention, the prediction sample values in the Viterbi decoding are made different in correspondence to the kind of recording medium to be played. Since the Viterbi decoding suitable for the target recording medium, transmission characteristics of the reading signal system including the reading means, and amplitude of the read signal can be executed, the digital data can be correctly reproduced from the recording disc.

What is claimed is:

1. A digital data information reproducing apparatus for different kinds of recording media each storing a digital data signal, comprising:

reading means for reading said digital data signal recorded on a target recording medium and forming a read signal;

A/D converting means for A/D converting said read signal and forming a series of reproduction sample values;

prediction value setting means for forming prediction values determined in accordance with a kind of said target recording medium; and Viterbi decoding means for performing a Viterbi decoding based on said prediction values with respect to said reproduction sample values, thereby forming a reproduction digital signal.

2. An apparatus according to claim 1, wherein said recording media are optical discs having the same radii as each other and different information recording densities from each other.

3. An apparatus according to claim 2, wherein said prediction value setting means sets a group of prediction values in accordance with a disc discrimination signal indicative of the kind of said disc which has been read out from a specific recording area which is common to said recording media.

4. An apparatus according to claim 2, wherein said prediction value setting means sets a group of prediction values in accordance with a density discrimination signal indicative of an information recording density of said target disc, said density discrimination signal having been read out from a specific recording area of said target recording medium.

5. An apparatus according to claim 2, wherein said prediction value setting means sets a group of prediction values in accordance with a reflectance discrimination signal indicative of a light reflectance on an information recording surface of said target disc, said reflectance discrimination signal being read out from a specific recording area of said target recording medium.

6. An apparatus according to claim 2, wherein said prediction value setting means sets a group of prediction values in accordance with a reproduction layer discrimination signal for identifying an information recording surface of the disc, said reproduction layer discrimination signal being read out from a specific recording area of said target recording medium.

7. An apparatus according to claim 2, wherein said prediction value setting means detects an amplitude of a minimum inversion interval signal which has been read out from a specific recording area of said target recording medium and sets a group of prediction values in accordance with the detected amplitude.

8. An apparatus according to claim 2, wherein said prediction value setting means detects an amplitude of a sample value train of a minimum inversion interval from said reproduction sample value and sets a group of prediction value in accordance with the detected amplitude.

9. An apparatus according to claim 1, wherein said prediction value setting means holds a plurality of groups of prediction value each group corresponding to each of the kinds of said recording media, selects one of said prediction value groups corresponding to a discrimination result for the target recording medium, and supplies the selected one to said Viterbi decoding means.

* * * * *